(12) United States Patent
Voss et al.

(10) Patent No.: US 8,733,204 B2
(45) Date of Patent: May 27, 2014

(54) SLIDING BEZEL

(75) Inventors: Roy N. Voss, Elgin, IL (US); Adrian A. Bruno, Rolling Meadows, IL (US)

(73) Assignee: Weber-Stephen Products Co., Palatine, IL (US)

( * ) Notice: Subject to any disclaimer, the term of this patent is extended or adjusted under 35 U.S.C. 154(b) by 1298 days.

(21) Appl. No.: 11/678,433

(22) Filed: Feb. 23, 2007

(65) Prior Publication Data

US 2008/0202351 A1    Aug. 28, 2008

(51) Int. Cl.
*A47J 37/07* (2006.01)
*F24C 3/12* (2006.01)

(52) U.S. Cl.
USPC ............................................................ 74/553

(58) Field of Classification Search
USPC ................ 74/10 R, 553; 292/341.18, 341.19, 292/DIG. 60; 248/71, 73, 224.8, 225.21; 411/508–510, 913, 45–48; 403/329; 16/441; 116/216, 292
See application file for complete search history.

(56) References Cited

U.S. PATENT DOCUMENTS

| | | | | |
|---|---|---|---|---|
| 1,209,037 | A | * | 12/1916 | Rosenfeld ...................... 126/317 |
| 1,297,528 | A | * | 3/1919 | Wright ...................... 292/341.19 |
| 1,784,755 | A | * | 12/1930 | Rosenberg ...................... 411/45 |
| 2,572,428 | A | * | 10/1951 | Anstine ...................... 292/341.18 |
| 3,107,113 | A | * | 10/1963 | Sconzo .......................... 292/228 |
| 3,427,061 | A | * | 2/1969 | Gresham et al. .............. 292/353 |
| 4,070,945 | A | * | 1/1978 | Kurosaki ...................... 411/182 |
| 4,087,123 | A | * | 5/1978 | Redshaw ................. 292/341.19 |
| 4,114,589 | A | * | 9/1978 | Berlik et al. ................ 126/21 R |
| 4,263,833 | A | * | 4/1981 | Loudin et al. .................... 411/41 |
| 4,445,455 | A | * | 5/1984 | Cannon ......................... 116/216 |
| 4,499,630 | A | | 2/1985 | Harris et al. |
| 4,726,722 | A | * | 2/1988 | Wollar ............................ 411/32 |
| 5,384,442 | A | | 1/1995 | Danner |
| 5,509,174 | A | | 4/1996 | Worrell |
| 5,540,528 | A | * | 7/1996 | Schmidt et al. ................. 411/55 |
| D498,657 | S | | 11/2004 | Milrud et al. |

OTHER PUBLICATIONS

Char-Broil, Designer Series, Product Guide, Model No. 463261106.
Char-Broil, TEC, Product Guide, Model No. 463268307.
Fastex, Product Spec Sheets, (www.itw-fastex.com/catalog/017.php).

* cited by examiner

*Primary Examiner* — Thomas Diaz
(74) *Attorney, Agent, or Firm* — David I. Roche; Baker & McKenzie LLP

(57) ABSTRACT

The present invention is directed to a control knob bezel plate for a barbecue grill. The preferred bezel plate assembly of the present invention comprises a bezel plate, a control knob, a control panel, a gas control valve, and two anchors. The preferred bezel plate includes a raised annular portion which serves as a frame for the control knob. Both the preferred bezel plate and the control panel include two parallel slots which are adapted to engage with the anchors. The two parallel slots in the bezel plate are aligned generally transverse to the two parallel slots in the control panel. The bezel plate is connected to the control panel by means of the anchors which are configured to slide within the slots. In this manner, the bezel plate can be adjusted in two dimensions with respect to the panel.

20 Claims, 4 Drawing Sheets

SLIDING BEZEL

FIELD OF THE INVENTIONS

The inventions described and claimed herein relate generally to bezels for control knobs. More specifically, the inventions described and claimed herein relate to control knob bezels for gas-fired barbecue grills which are simultaneously adjustable along two axes to allow for centering alignment of the bezel with the control knob and/or the gas control valve.

BACKGROUND OF THE INVENTIONS

Most gas cooking appliances, including gas-fired barbecue grills, utilize valve and knob combinations for controlling the temperature and flame intensity. These valve and knob combinations commonly utilize so-called "push to turn" shafts which are aligned with associated apertures in the appliance walls. In other words, common control knobs are movable inwardly and outwardly over a limited range of axial movement, are biased towards the outwardly position, and are rotatable about the axis only when moved inwardly. As such, most gas cooking appliances require a gap or space between the control knob and the appliance wall to facilitate the "push to turn" function. It is recognized that these gaps or spaces may not be desirable, since the gaps not only detract from the overall appearance of the grill but also provide a location for food and grease to accumulate. Additionally, food or grease can easily reach the aperture in the appliance wall and accumulate inside of the appliance.

As a result, some manufacturers incorporate bezel assemblies into their appliances, especially on higher-end models. Bezels typically include two or more pre-drilled holes which are adapted to align with pre-drilled holes in the appliance wall. The bezel is attached to the appliance wall by means of fasteners which pass through the respective pre-drilled holes. The bezel also typically includes an aperture which is aligned with an aperture in the appliance wall. In this manner, the bezel is aligned co-axially with the valve shaft. Bezels also usually include an annular raised portion with an inner diameter which closely corresponds with the outer diameter of the control knob. The annular raised portion of the bezel serves to "frame" the control knob, thereby substantially covering the inherent gap between the knob and the appliance wall and reducing the amount of debris which will accumulate under the control knob. Moreover, the annular portion serves an aesthetic purpose by streamlining the control panel of the appliance.

While prior art bezels of the type described above solve some of the heretofore-mentioned problems which are inherent to gas appliances, many complex and challenging problems still remain. For example, manufacturers of such gas appliances still struggle with alignment problems. More specifically, depending upon the design of the grill, it may be troublesome to align the bezel to be perfectly centered with the axis of the valve shaft. Failure to align the bezel with the shaft (and, in turn, with the control knob) can have some detrimental implications. For example, there is usually only a small space between the annular raised portion of the bezel and the control knob. As such, it is usually visually apparent when the bezel is not perfectly centered with the control knob. Moreover, if the bezel is not perfectly aligned with the valve shaft, it can be difficult or near impossible to bring the control knob into engagement with the valve shaft without bending or otherwise damaging the stem of the control knob of the shaft of the valve.

Some manufacturers have attempted to solve this problem by replacing the pre-drilled mounting holes in the bezel with pre-drilled slots which allow the plate to be shifted relative to the pre-drilled mounting hole in the appliance wall. See, for example, the prior art bezel assembly shown in FIG. 11. This solution is somewhat adequate for grill designs in which the gas control valve is directly mounted to the back side of the control panel. In such cases, the manufacturer is capable of positioning the pre-drilled mounting holes for the bezel and the valve within reasonable tolerances, such that the assembler need only make minor adjustments of the bezel by sliding the bezel relative to the control panel along the length of the slotted mounted holes. Nevertheless, perfect or near-perfect alignment can not be guaranteed using the prior art bezels since the bezel can only be adjusted in a significant manner along a single axis, designated by axis Y in FIG. 11.

The prior art solution described above is inadequate or at least impractical for other grill designs in which the gas control valve is mounted to some other component of the grill, besides the control panel. In such cases, the position of the valve shaft relative to the aperture in the appliance wall cannot be easily controlled due to tolerance accumulation. To ensure perfect alignment in such cases would require significant additional design work and expense. Therefore, there is a need in the art for a bezel assembly which can be adjusted simultaneously along two axes.

SUMMARY OF THE INVENTIONS

The various embodiments of the present inventions provide a satisfactory means for overcoming the problems of the prior art bezel assemblies. More specifically, the present inventions include a bezel assembly which allows for adjusting the bezel along a two-dimensional plane with respect to the appliance wall (or control panel).

The preferred bezel assembly generally comprises a bezel plate, a panel, and two anchors. The preferred bezel plate includes a central aperture which is bounded on two sides by a pair of slots, which are aligned generally parallel. The preferred panel also includes a central aperture, which is generally aligned with the central aperture in the bezel plate, wherein the central aperture of the panel is also bounded on two sides by a pair of parallel slots. The pair of slots in the panel are preferably aligned perpendicular or transverse to the pair of slots in the bezel. The anchors are adapted to be disposed between the bezel and the panel, whereby each anchor has a first bearing feature for sliding engagement with one of the slots in the bezel plate and a second bearing feature for sliding engagement with one of the slots in the panel. The bearing features preferably fit snugly within the side walls of the slots, although the bearing features preferably have a length which is substantially less that the length of the slots, whereby the bearing features can slide within the slots along its length. As such, when the bezel plate assembly is assembled, the bezel plate can be simultaneously adjusted along at least two axes with respect to the panel.

BRIEF DESCRIPTION OF THE DRAWINGS

These and other features, aspects, objects, and advantages of the inventions described and claimed herein will become better understood upon consideration of the following detailed description, appended claims, and accompanying drawings where:

Figure 1:
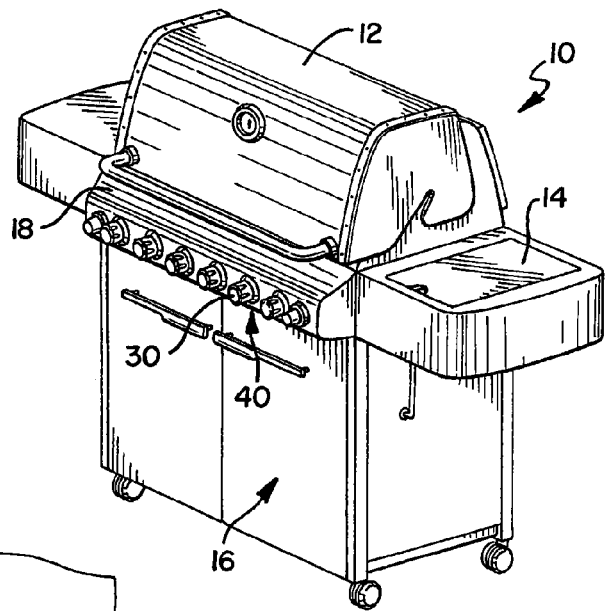
FIG. 1 is a perspective view of a barbecue grill which includes a preferred bezel assembly of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from figure to figure in the following description of the drawings.

DETAILED DESCRIPTION OF THE DRAWINGS

Referring first to FIG. 1, an exemplary barbecue grill 10, which incorporates one embodiment of the inventions described and claimed herein, is depicted. The barbecue grill 10 of FIG. 1 comprises typical features such as a cooking chamber 12, side shelves 14, a cart assembly 16, and a control panel 18. Although the control panel 18 is shown situated at a front side of the grill 10, slightly below the lid of the cooking chamber 12, the control panel 18 can be situated elsewhere as governed by various design considerations. For example, some grills may incorporate the control panel into the side shelves 14 or the cart assembly 16.

Barbecue grill control panels (otherwise referred to herein as, and considered equivalent to, the appliance wall) 18 typically include various controls for the barbecue grill. For example, the control panel 18 for the exemplary barbecue grill 10 of FIG. 1 includes a plurality of control knobs 30 for controlling the flame intensity and temperature inside of the cooking chamber 12. The control panel 18 could also include such items as an igniter assembly 20 for lighting the barbecue grill 10. The number of control knobs 30, and related assemblies, on a typical barbecue grill 10 can vary from one for small, portable-type grills (not shown) to six or more for large, professional-style barbecue grills. The present inventions relate generally to a bezel (or bezel plate) assembly 40 for the control knobs 30, which engages with the control panel wall 18 and frames the control knob 30.

Figure 2:
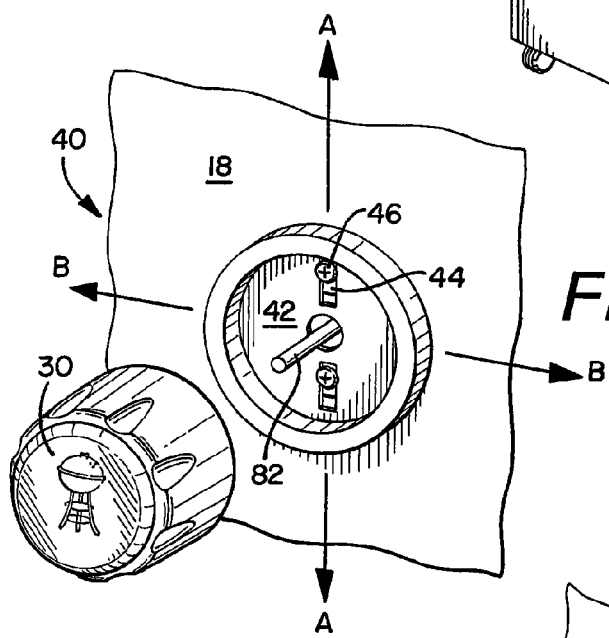
FIG. 2 is a partially exploded, close-up, perspective view of the barbecue grill showing the preferred bezel assembly.

Turning now to FIG. 2, a partial exploded view of a preferred embodiment of the bezel assembly 40 is shown along with the control knob, gas control valve 80, and valve shaft 82, wherein the bezel assembly 40 generally comprises the panel 18, a bezel (or bezel plate) 42, two anchors 44, and two fasteners 46. The two anchors 44 are configured to engage with both the panel 18 and the bezel 42, whereby the bezel 42 is retained generally flush against the panel 18. Moreover, the two anchors 44 are configured to be movable relative to the bezel 42 along a first axis A and movable relative to the panel 18 along a second axis B, wherein the first axis A is not parallel to the second axis B. In this manner, the bezel 42 can be simultaneously adjusted relative to the panel 18 along both axis A and axis B. Preferably, the first axis A is perpendicular to the second axis B to allow the greatest range of movement for the bezel 42, although such configuration is not necessary. Furthermore, although the Figures show axis A aligned vertically and axis B aligned horizontally, such alignment is merely for convenience and not by necessity. Indeed, it is contemplated that axes A and B can be aligned at any angle relative to horizontal and vertical. Moreover, although the panel is shown oriented vertically, such orientation is not necessary. It is contemplated that the panel 18 can also be orientated horizontally or at any angle relative to horizontal or vertical.

Figure 3:
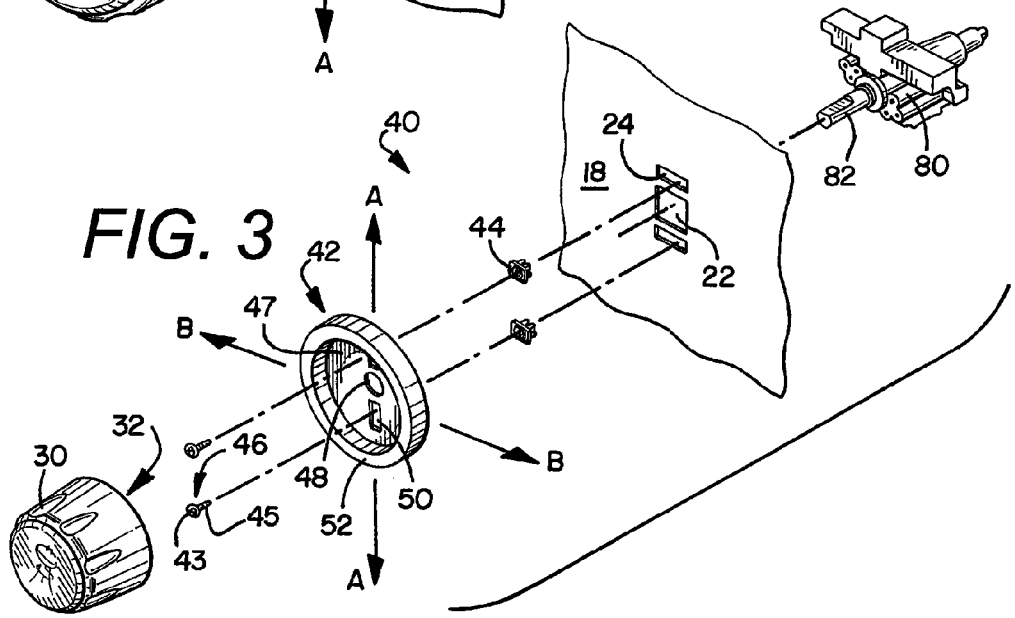
FIG. 3 is a fully exploded, close-up, perspective view of the barbecue grill showing the preferred bezel assembly.

Turning now to FIG. 3, a fully exploded view of the preferred bezel assembly 40, the various features of the inventions are shown in more detail. The preferred panel 18 generally comprises a central aperture 22, which allows for mating engagement between the control knob 30 and the valve stem 82, and at least one, and preferably two, slots 24. The central aperture 22 is preferably generally rectangular or square, as shown in the figure, although the inventions are not limited as such. Indeed, the central aperture 22 can be any complimentary shape such as round, triangular, etc. The desired size and shape of the central aperture 22 can vary depending upon the mounting location of the valve and the tolerances of various components of the barbecue grill. More simply, the required size and shape of the central aperture will vary depending upon the expected range of positions where the valve stem could be situated after assembly of the barbecue grill. The two slots 24 are preferably parallel and positioned on opposite sides of the central aperture 22 (or are preferably diametrically opposite if the central aperture is circular). The two slots 24 define channel ways for the anchors 44, allowing the anchors 44 to slide along the length of the slot, wherein the length of the slots 24 are parallel with axis B.

The preferred bezel 42 generally comprises a generally flat central portion 47 and a raised generally annular portion 52. The central portion 47 includes a central aperture 48, like the panel 18, although the central aperture 48 of the bezel 42 need not be as large as the central aperture 22 of the panel 18. Moreover, the central aperture 48 can have any complimentary shape, including circular, rectangular, square, triangular, etc. However, the central aperture 48 should generally align with the central aperture 22 when the bezel 42 is mounted to the panel 18. That is, a portion of the central aperture 48 should overlap with the central aperture 22 when the bezel assembly 40 is assembled. The central portion 47 also includes at least one, and preferably two parallel, slots 50 which are situated at opposite sides (or diametrically opposite, as the case may be) of the central aperture 48. The slots 50 preferably have openings which overlap with the slots 24 in the panel 18 when the bezel 42 is mounted to the panel 18. However, the slots 50 are not aligned in parallel with the slots 24 in the panel. Instead, the length of the slots 50 are preferably generally aligned along axis A. The two slots 50, like the slots 24 in the panel 18, define channel ways for the anchors 44, allowing the anchors 44 to slide along the length of the slot 50, wherein the length of the slots 50 are parallel with axis A.

Figure 4:
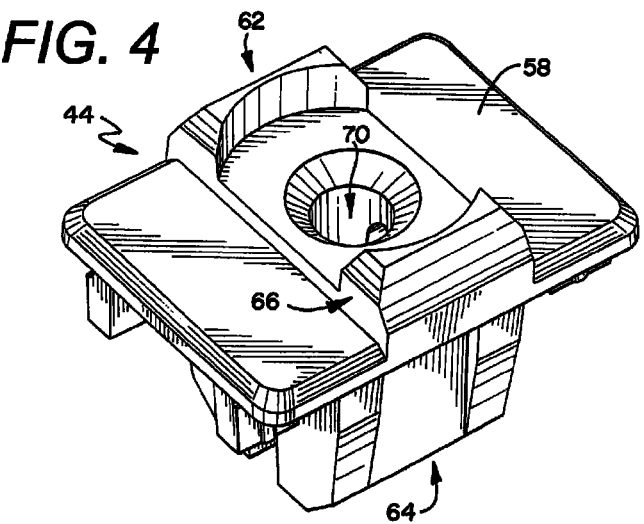
FIG. 4 is a first perspective view of the preferred embodiment of the anchor.
Figure 5:
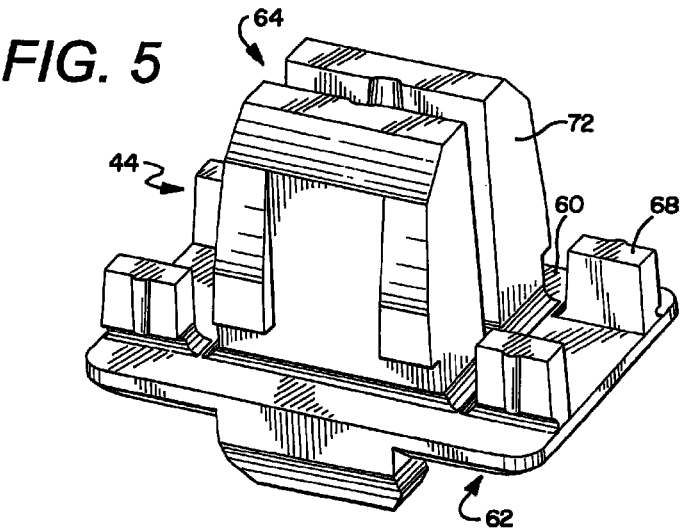
FIG. 5 is a second perspective view of the preferred embodiment of the anchor.

Turning now to FIGS. 4 and 5, the preferred anchor 44 is shown in more detail. The preferred anchor 44 has a first bearing feature 62 on a first side of the anchor 44 and a second bearing feature 64 on a second side of the anchor 44. The preferred bearing features 62, 64 each include a surface 58, 60 which is configured to bear against one or the other of the outside surface of the panel 18 or the inside surface of the bezel 42. Although the surfaces 62, 64 are generally flat in the depicted embodiment, it is contemplated that the surfaces 62, 64 could be non-planar, discontinuous, and/or curvilinear. Such a configuration could have advantages, such as reducing the contact surface area between the anchor 44 and the panel 18 and the bezel 42 to enable easier sliding of the bezel 42 relative to the panel 18. To further enable and/or enhance sliding of the bezel, the anchor 44 could also be made out of a plastic or other low friction material.

The preferred bearing features 62, 64 of the anchor 44 also include first and second guide features 66, 68 which are configured to engage with the slots 50, 24 in the bezel 42 and the panel 18, respectively. The preferred guide features 66, 68 are generally characterized as projections which extend from the surfaces 58, 60 and preferably fit snugly against the side walls of the slots 50, 24 allowing linear sliding movements of the anchor 44 along the length of the slots 50, 24.

Figure 6:
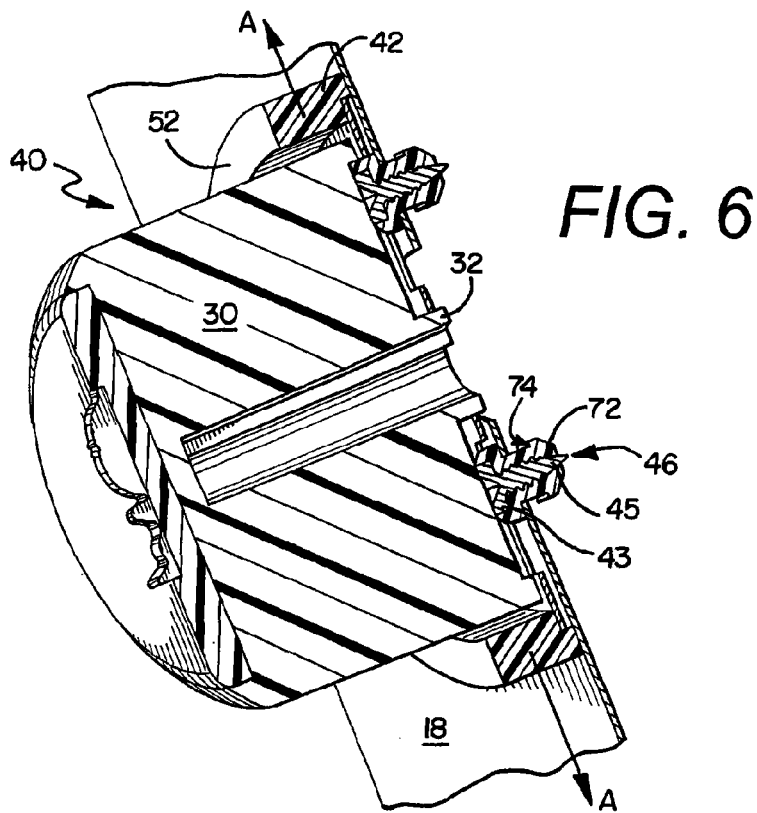
FIG. 6 is a sectional view of the barbecue grill taken along the axis A identified in FIGS. 2 and 3 and showing the preferred bezel assembly.

The anchor 44 also preferably includes means for retaining the anchor 44 in engagement within the slots 50, 24 of the panel 18 and the bezel 42. For instance, the anchor 44 depicted in FIGS. 4 and 5 include a bore 70 which extends from the first bearing feature 62 to the second bearing feature 64 and is adapted to receive a fastener 46. The bore 70 is preferably centrally located within the first guide feature 66 and is adapted to receive the fastener 46 at the first side of the anchor 44. The fastener 46 can be any type of fastener, although the preferred fastener 46 is a screw having a head portion 43 and a thread portion 45. As best shown in FIG. 6, which is a sectional view of the bezel assembly 40 along axis A, the thread portion 45 is adapted to engage with an inside surface of the bore 70, which may or may not be pre-tapped. And, as best shown in FIG. 2, the head portion 43 is preferably circular and has a diameter which is greater than the width of the slot 50. In this manner, the head portion 43 of the fastener 46 engages with the central portion 47 of the bezel 42, on either side of the slot 50, while the threaded portion 45 of the fastener 46 engages with the anchor 44, thereby securely fastening the anchor 44 to the bezel 42. Note, however, that it is contemplated that the head portion 43 of the fastener 46 need not be circular, and can be square, octagonal, hexagonal, or any other complementary shape. In any case, whether the head portion 43 is round or otherwise, the head portion 43 preferably has an effective diameter which is greater than the width of the slot 50.

Referring now to FIG. 4-6, the second bearing feature 64 includes two expandable legs (or split-legs) 72, which are disposed on opposite sides of the bore 70, for connecting the anchor 44 to the panel 18. The split-leg members 72 are configured to expand when the fastener 46 is inserted therethrough, thereby locking the anchor 44 in engagement with the slot 24. The split-leg members 72 can engage with the slot 24 by way of a friction-fit and/or the split-leg members 72 can include a ledge or extent 74 which is adapted to engage with the inside surface of the panel 18 thereby preventing the anchor 44 from being removed from engagement with the panel 18.

Note that while for the preferred embodiment of the anchor 44, the split-leg locking feature 72 is part of the second bearing feature 64 and the first bearing feature 62 is situated on the side of the anchor 44 adapted to receive the fastener 46, such configuration can be reversed. In such case, for example, the fastener 46 is received from the inside surface of the panel 18 there locking the panel 18 to the anchor 44, and the expandable split-leg members engage with the slot 50 in the bezel 42.

Figure 7:
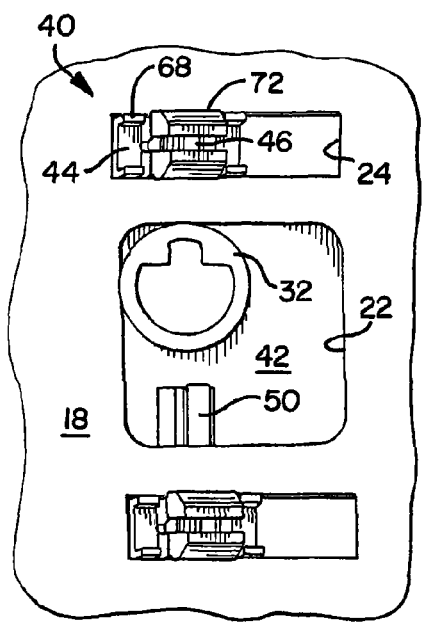
FIG. 7 is a rear view of the control panel for the barbecue grill showing the preferred bezel plate in a first position.
Figure 8:
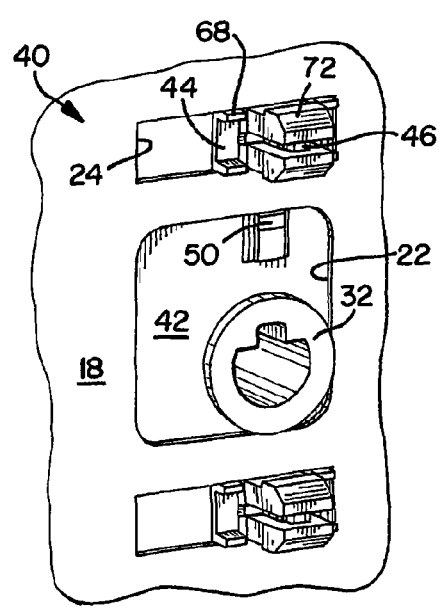
FIG. 8 is a rear view of the control panel for the barbecue grill showing the preferred bezel plate in a second position.

The first bearing surface 62 allows the anchor 44 to slide within the slot 50 in the bezel 42 along the first axis while the second bearing surface 64 allows the anchor 44 to simultaneously slide within the slot 24 in the panel 18 along the second axis. Since the anchor is positioned between the bezel 42 and the panel 18 and serves to interconnect the two, the bezel 42 can be effectively moved simultaneously along two axes relative to the panel. This feature is best demonstrated by FIGS. 7 and 8, which show the bezel assembly 40 from the inside of the control panel (or appliance wall) 18. Comparing FIG. 7 to 8, one will notice that the bezel 42 (and therefore the stem 32 of the knob 30) is movable in two-dimensions relative to the panel. For example, in FIG. 7, the stem 32 is positioned in the upper left hand corner of the central aperture 22 of the panel 18, while in FIG. 8, the stem 32 is positioned in the lower right hand corner of the central aperture 22. In fact, in the preferred embodiment, the sliding relationship between the anchors 44 and the slots 24, 50 allow the stem 32 to be positioned anywhere within the central aperture 22 such that the stem 32 can be aligned perfectly with the valve shaft (not shown). For example, in FIG. 7, the second bearing feature 64 is positioned at the far left extent of the slot 24 in the panel 18 such that the stem is positioned near the far left extent of the central aperture 22. In contrast, in FIG. 8, the second bearing feature 64 is positioned at the far right extent of the slot 24 in the panel 18 such that the stem is positioned near the far right extent of the central aperture 22. If follows from this that the stem 32 can be positioned approximately anywhere between the far left extent and the far right extent of the aperture 22. Moreover, the stem 32 can simultaneously be positioned approximately anywhere between the upper extent and the lower extent. For instance, in FIG. 7, the first bearing feature 62 (not shown) is situated at the lower extent of the slot 50, such that the stem 32 is positioned near the upper extent of the aperture 22. In contrast, in FIG. 8, the first bearing feature 62 is situated at the upper extent of the slot 50, such that the stem 32 is positioned near the lower extent of the aperture 22.

Figure 9:
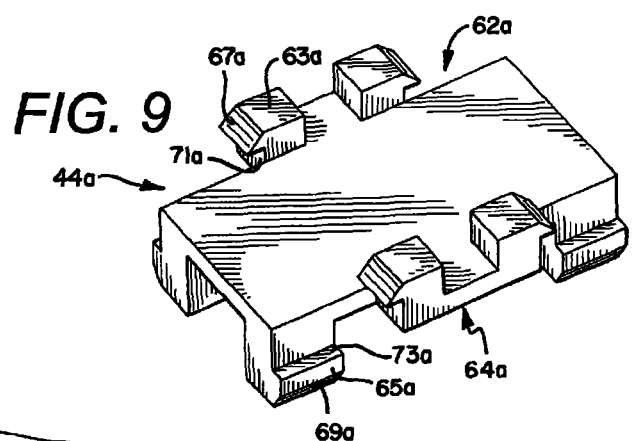
FIG. 9 is a perspective view of an alternative snap-fit embodiment of the anchor.
Figure 10:
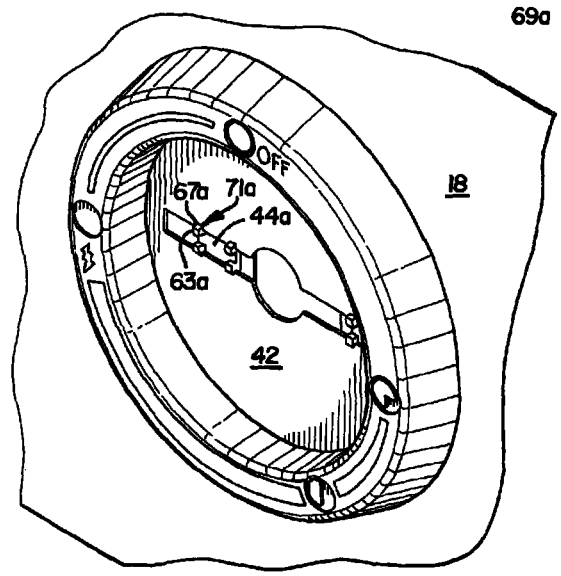
FIG. 10 is a perspective view of an alternative bezel assembly which incorporates the snap-fit anchor; and, FIG. 11 is an exploded perspective view of a prior art bezel assembly, which only allows for adjustment of the bezel in one dimension.
Figure 11:
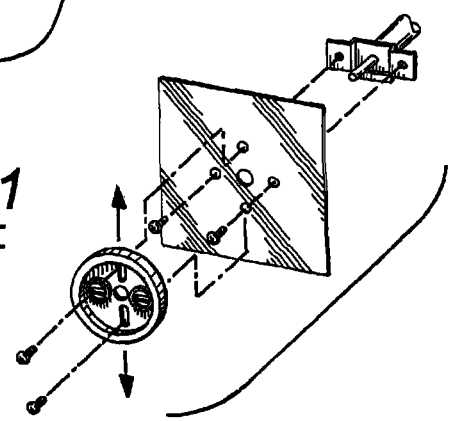

Although the anchor 44 has been described in terms of its preferred embodiment, it is contemplated that the anchor 44 can take many different forms. For example, the anchor could simply comprise a fastener, wherein the width of the slots 24, 50 are sized to conform to the diameter of the threaded portion of the fastener. Many different types of fasteners would work, such as a bolt and nut combination, or a rivet or a self-tapping screw. Alternatively, the anchor 44a could take form as shown in FIGS. 9 and 10. Like the preferred embodiment described above, the anchor 44a includes a first bearing feature 62a on a first side and a second bearing feature 64a on a second side. However, the bearing features 62a and 64a include snap-fit connections 63a, 65a for connecting to the bezel 42 and the panel 18, rather than including a screw fastener 46. The preferred snap-fit connection is a locking projection 63a, 65a, which includes an inclined leading edge 67a, 69a and a stop surface 71a, 73a. The inclined leading edge 67a, 69a is adapted to bias the locking projection 63a, 65a inward when the bearing feature 62a, 64a is pressed into engagement with the slot 50, 24, which allows the projections to pass through the slots 50, 24. Once pushed through the slots 50, 24, the stop surfaces 71a, 73a abut the either the outside surface of the bezel 42 (as shown in FIG. 10) or the inside surface of the panel 18, thereby retaining the anchor 44a in engagement with both the panel 18 and the bezel 42.

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

We claim:

1. A bezel plate assembly for a barbecue grill comprising:
   a bezel plate having at least one slot;
   a panel having at least one slot, wherein the at least one slot in the panel is not parallel to the at least one slot in the bezel plate;
   at least one anchor having a front surface and a back surface, wherein a portion of the at least one anchor is disposed between the bezel plate and the panel such that a portion of the front surface and a portion of the back surface are both disposed between the bezel plate and the panel, wherein the portion of the front surface of the at least one anchor bears against the bezel plate and the portion of the back surface of the at least one anchor bears against the panel, wherein the at least one anchor engages with the panel and bezel plate, the at least one anchor having a first bearing feature on the front surface, the first bearing feature in sliding engagement with the at least one slot in the bezel plate and a second bearing feature on the back surface, the second bearing feature in sliding engagement with the at least one slot in the panel, wherein the bezel plate can be simultaneously adjusted along at least two axes with respect to the panel during assembly of the bezel plate assembly; and
   wherein the at least one anchor has at least one bore extending from the front surface to the back surface.

2. The bezel plate assembly of claim 1, wherein the anchor is a split-leg expandable anchor.

3. The bezel plate assembly of claim 1, wherein the at least one slot in the panel is generally perpendicular to the at least one slot in the bezel plate.

4. The bezel plate assembly of claim 1, wherein:
   the quantity of the at least one slot in the bezel plate is two, whereby the two slots are aligned in parallel;
   the quantity of the at least one slot in the panel is two, whereby the two slots are aligned in parallel and are generally transverse to the two slots in the bezel plate; and,
   the quantity of the at least one anchor is two, whereby the two anchors are disposed between the bezel plate and the panel, each of the two anchors having the first bearing feature in sliding engagement with one of the two slots in the bezel plate and the second bearing feature in sliding engagement with one of the two slots in the panel, wherein the bezel plate can be simultaneously adjusted along at least two axes with respect to the panel during assembly of the bezel plate assembly.

5. The bezel plate assembly of claim 1, wherein the first bearing feature slides within the slot in the bezel plate along a first axis.

6. The bezel plate assembly of claim 5, wherein the second bearing feature slides within the slot in the panel along a second axis.

7. The bezel plate assembly of claim 6, wherein the first axis is generally perpendicular to the second axis.

8. The bezel plate assembly of claim 1, wherein the anchor receives a fastener for securing the anchor to the bezel plate, and wherein the bezel plate can be simultaneously adjusted along at least two axes with respect to the panel before the bezel plate is fastened.

9. The bezel plate assembly of claim 8, wherein the fastener includes a threaded portion for engagement with the anchor and a head portion for engagement with the bezel plate, whereby the head portion has an effective diameter which is greater than a width of the slot in the bezel plate.

10. The bezel plate assembly of claim 9, wherein the second bearing feature includes two leg portions which extend through the slot in the panel and which receive the fastener therebetween, whereby the two leg portions expand and secure the anchor to the panel.

11. The bezel plate assembly of claim 1, wherein the first bearing feature includes a snap-fit connection for connecting the anchor to the bezel plate.

12. The bezel plate assembly of claim 11, wherein the snap-fit connection includes at least two laterally-displaced protuberances which are configured to engage with an outer surface of the bezel plate on either side of the slot in the bezel plate.

13. The bezel plate assembly of claim 1, wherein the second bearing feature includes a snap-fit connection for connecting the anchor to the panel.

14. The bezel plate assembly of claim 13, wherein the snap-fit connection includes at least two laterally-displaced protuberances which are configured to engage with an inner surface of the panel on either side of the slot in the panel.

15. The bezel plate assembly of claim 1, wherein the anchor includes first and second guide features configured to engage with the slots in the bezel and panel, respectively.

16. The bezel plate assembly of claim 15, wherein the first guide feature comprises a projection extending from the front surface, and wherein the second guide feature comprises a projection extending form the back surface.

17. A barbecue grill assembly comprising:
   a bezel plate having a raised annular portion, a central aperture, and two slots, one of which is disposed at a first side of the central aperture and the other of which is disposed at a second side of the central aperture, the two slots being aligned in parallel;
   a control knob having a stem for receiving a gas control valve shaft and being received in the annular portion of the bezel plate;
   a control panel having an central aperture and twos slots, one of which is disposed at a first side of the central aperture and the other of which is disposed at a second side of the central aperture, the two slots being aligned in parallel and being generally transverse to the two slots in the bezel plate, and the central aperture of the control panel being adapted to at least partially overlap with the central aperture of the bezel plate when the barbecue grill is assembled;
   the gas control valve shaft being adapted to be generally aligned with the central aperture of the control panel when the barbecue grill is assembled; and,
   two anchors being disposed between the bezel plate and the panel and being adapted to slide respective to the slots in the bezel plate and the control panel, at least one the two anchors having a front surface and a back surface, wherein a portion of the at least one of the two anchors is disposed between the bezel plate and the panel such that a portion of the front surface and a portion of the back surface are both disposed between the bezel plate and the panel, wherein the portion of the front surface of the at least one of the two anchors bears against the bezel plate and the portion of the back surface of the at least one of the two anchors bears against the panel, each of the two anchors having a first bearing surface for engaging with one of the two slots in the bezel plate and a second bearing surface for engaging with one of the two slots in the panel, whereby, when the bezel plate is assembled, the bezel plate can be adjusted in two dimensions with respect to the panel such that the control knob stem can mate with the control valve shaft and the control knob can be generally centered within the annular portion of the bezel plate.

18. A bezel plate assembly comprising:
a bezel plate having at least one slot being aligned in a first direction;
a panel having at least one slot being aligned in a second direction, the second direction being generally transverse to the first direction; and
at least one anchor having a front surface and a back surface, wherein a portion of the at least one anchor is disposed between the bezel plate and the panel such that a portion of the front surface and a portion of the back surface are both disposed between the bezel plate and the panel, wherein the portion of the front surface of the at least one anchor bears against the bezel plate and the portion of the back surface of the at least one anchor bears against the panel the at least one anchor having a first bearing surface that engages with the at least one slot in the bezel plate and a second bearing surface that engages with the at least one slot in the panel, whereby, the bezel plate can be adjusted along at least two axes with respect to the panel.

19. A bezel plate assembly for a barbecue grill comprising:
a bezel plate having at least one slot;
a panel having at least one slot, wherein the at least one slot is not parallel to the at least one slot in the bezel plate;
at least one anchor extending through the at least one slot in the bezel plate and the at least one slot in the panel thereby fastening the bezel plate to the panel, wherein a portion of the at least one anchor is disposed between the bezel plate and the panel, wherein at least a portion of the bezel plate is retained flush against the panel;
the anchor comprises a bore through which a fastener can be inserted, wherein the bezel plate can be simultaneously adjusted along at least two axes with respect to the panel before the bezel plate is fastened to the panel; and
the at least one anchor having a front surface and a back surface, wherein a portion of the front surface and a portion of the back surface are both disposed between the bezel plate and the panel, wherein the portion of the front surface of the at least one anchor bears against the bezel plate and the portion of the back surface of the at least one anchor bears against the panel.

20. The bezel plate assembly of claim 19, wherein the at least one anchor slides within the at least one slot in the bezel plate along a first axis and slides within the at least one slot in the panel along a second axis.

* * * * *